United States Patent
Sangani et al.

(10) Patent No.: US 10,915,416 B1
(45) Date of Patent: Feb. 9, 2021

(54) SYSTEM FOR ENVIRONMENTAL IMPACT

(71) Applicants: Vishakha Sangani, Austin, TX (US); Manan Sudhakarbhai Lakhani, Austin, TX (US); Emmanuel Okereke, Austin, TX (US); Jude Ogbuibe, Austin, TX (US)

(72) Inventors: Vishakha Sangani, Austin, TX (US); Manan Sudhakarbhai Lakhani, Austin, TX (US); Emmanuel Okereke, Austin, TX (US); Jude Ogbuibe, Austin, TX (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 0 days.

(21) Appl. No.: 16/530,653

(22) Filed: Aug. 2, 2019

(51) Int. Cl.
   G06F 11/30 (2006.01)
   G06Q 20/04 (2012.01)
   G06Q 30/02 (2012.01)

(52) U.S. Cl.
   CPC ....... G06F 11/3058 (2013.01); G06Q 20/042 (2013.01); G06Q 30/0233 (2013.01)

(58) Field of Classification Search
   CPC .............. G06F 11/3058; G06Q 20/042; G06Q 30/0233
   USPC .................................................. 705/14.27
   See application file for complete search history.

(56) References Cited

U.S. PATENT DOCUMENTS

| 2014/0258091 A1* | 9/2014 | Jouhikainen ......... G06Q 40/025 705/38 |
| 2015/0154717 A1* | 6/2015 | Stibel .................... G06Q 40/12 705/30 |
| 2015/0348083 A1* | 12/2015 | Brill ..................... G06Q 20/386 705/14.23 |

FOREIGN PATENT DOCUMENTS

EP   2128811 A1 * 12/2009  ......... G06Q 30/0246

OTHER PUBLICATIONS

Baroni, Evaluating the environmental impact of various dietary patterns combined with different food production systems, 2006 (Year: 2006).*

* cited by examiner

Primary Examiner — Tarek Elchanti
(74) Attorney, Agent, or Firm — Loeb & Loeb LLP

(57) ABSTRACT

The system and method may receive transaction data for a financial account associated with a user during a first time period and a second time period. A first environmental impact score for the transaction data associated with the user in the first time period may be determined and a second environmental impact score for the transaction data associated with the user in the second time period may also be determined. The first environmental impact score and the second environmental impact score may be compared. The system and method may determine whether there has been a change from the first environmental impact score to the second environmental impact score. In response to a determination that the second environmental impact score is less than the first environmental impact score; a bonus score may be determined for the user.

17 Claims, 8 Drawing Sheets

| | | |
|---|---|---|
| AMOUNT DUE: | $4,567.89 | |
| DATE DUE: | July, 1, 2020 | |
| TRANSPORTATION | | |
| 7/1 | PARKING | $35.00 |
| 7/2 | PARKING | $35.00 |
| 7/3 | PARKING | $35.00 |
| 7/3 | GASOLINE | $76.35 |
| 7/4 | PARKING | $45.00 |
| 7/4 | TOLL REFILL | $50.00 |
| 7/5 | PARKING | $45.00 | $321.35   — 310
| FOOD | | |
| 7/1 | BURGERS 'R US | $15.35 |
| 7/3 | BEER HAUS | $45.76 |
| 7/5 | BURGERS 'R US | $15.35 | $76.46   — 320
| UTILITIES | | |
| 7/1 | ELECTRICITY | $95.62 |
| 7/2 | NATURAL GAS | $56.23 |
| 7/3 | WATER | $76.36 |
| 7/3 | SANITARY | $84.35 | $312.56   — 330

FIG. 3A

| | | |
|---|---|---|
| AMOUNT DUE: | $2,367.89 | |
| DATE DUE: | AUGUST, 1, 2020 | |
| TRANSPORTATION | | |
| 8/1 | PUBLIC TRANSIT | $85.00 | $85.00   — 315
| FOOD | | |
| 8/1 | SALAD SPINNERS | $5.35 |
| 8/3 | JUICE PLUS | $5.76 |
| 8/5 | FARMERS MARKET | $25.35 | $36.46   — 325
| UTILITIES | | |
| 8/1 | ELECTRICITY | $35.62 |
| 8/2 | NATURAL GAS | $26.23 |
| 8/3 | WATER | $36.36 |
| 8/3 | SANITARY | $24.35 | $158.18   — 335

FIG. 3B

AMOUNT DUE: $2,367.89
DATE DUE: AUGUST, 1, 2020

TRANSPORTATION
8/1  PUBLIC TRANSIT PASS  $85.00

FOOD
8/1  SALAD SPINNERS  $5.35
8/3  JUICE PLUS  $5.76
8/5  FARMERS MARKET  $25.35

UTILITIES
8/1  ELECTRICITY  $35.62
8/2  NATURAL GAS  $26.23
8/3  WATER  $36.36
8/3  SANITARY  $24.35

ENVIRONMENTAL BONUS
+763 POINTS

SYSTEM FOR ENVIRONMENTAL IMPACT

BACKGROUND

The environment on Earth continues to change. While the precise mechanisms of cause and effect on the environment are not perfectly understood, there are some clear causes and effects which are known. Attempts to educate the public about the clear negative causes and negative effects has had limited success in changing behavior in a way that will positively affect the environment.

SUMMARY

The following presents a simplified summary of the present disclosure in order to provide a basic understanding of some aspects of the disclosure. This summary is not an extensive overview. It is not intended to identify key or critical elements of the disclosure or to delineate its scope. The following summary merely presents some concepts in a simplified form as a prelude to the more detailed description provided below.

The present system and method attempts to identify the environmental impacts of transactions and encourage behavior and related transactions that have a positive or reduced negative affect on effect on the environment. The system and method may receive transaction data for a financial account associated with a user during a first time period and a second time period. A first environmental impact score for the transaction data associated with the user in the first time period may be determined. A second environmental impact score for the transaction data associated with the user in the second time period may also be determined. The first environmental impact score and the second environmental impact score may be compared. The system and method may determine whether there has been a change from the first environmental impact score to the second environmental impact score. In response to a determination that the second environmental impact score is less than the first environmental impact score; a bonus score may be determined for the user.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

FIG. 3A may be an illustration of a statement for a first time period;

FIG. 3B may be an illustration of a statement for a second time period;

FIG. 4 may be an illustration of a bonus being displayed;

SPECIFICATION

The environment on Earth continues to change. While the precise mechanisms of cause and effect on the environment are not perfectly understood, there are some clear causes and effects which are known. Attempts to educate the public about the clear negative causes and negative effects has had limited success in changing behavior in a way that will positively affect the environment.

The present system and method attempts to identify the environmental impacts of transactions and encourage behavior and related transactions that have a positive or reduced negative affect on effect on the environment. The system and method may receive transaction data for a financial account associated with a user during a first time period and a second time period. A first environmental impact score for the transaction data associated with the user in the first time period may be determined. A second environmental impact score for the transaction data associated with the user in the second time period may also be determined. The first environmental impact score and the second environmental impact score may be compared. The system and method may determine whether there has been a change from the first environmental impact score to the second environmental impact score. In response to a determination that the second environmental impact score is less than the first environmental impact score; a bonus score may be determined for the user.

Figure 1:
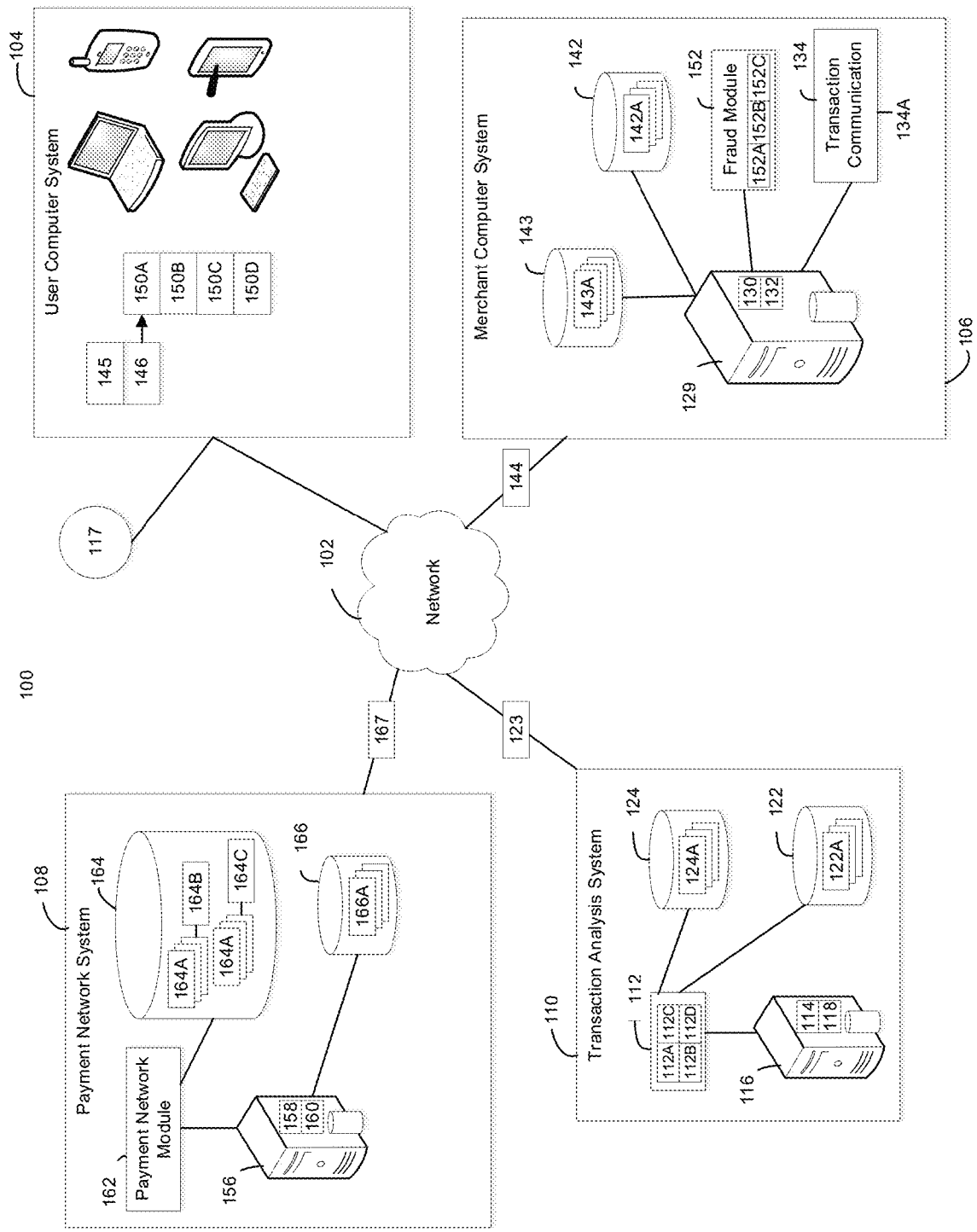
FIG. 1 may be an illustration of a payment system.

Referring to FIG. 1 which generally illustrates one embodiment of a private network such as a payment system used by a merchant 106. The system 100 may include a computer network 102 that links one or more systems and computer components. In some embodiments, the system 100 includes a user computer system 104, a merchant computer system 106, a payment network system 108, and a transaction analysis system 110 which may embody artificial intelligence.

The network 102 may be described variously as a communication link, computer network, internet connection, etc. The system 100 may include various software or computer-executable instructions or components stored on tangible memories and specialized hardware components or modules that employ the software and instructions to identify related transaction nodes for a plurality of transactions by monitoring transaction communications between users and merchants.

The various modules may be implemented as computer-readable storage memories containing computer-readable instructions (i.e., software) for execution by one or more processors of the system 100 within a specialized or unique computing device. The modules may perform the various tasks, methods, blocks, sub-modules, etc., as described herein. The system 100 may also include both hardware and software applications, as well as various data communications channels for communicating data between the various specialized and unique hardware and software components.

Networks are commonly thought to comprise the interconnection and interoperation of hardware, data, and other entities. A computer network, or data network, is a digital telecommunications network which allows nodes to share resources. In computer networks, computing devices exchange data with each other using connections, i.e., data links, between nodes. Hardware networks, for example, may include clients, servers, and intermediary nodes in a graph topology. In a similar fashion, data networks may include data nodes in a graph topology where each node includes related or linked information, software methods, and other data. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications or data network.

A computer, other device, set of related data, program, or combination thereof that facilitates, processes information and requests, and/or furthers the passage of information from a source user to a destination user is commonly referred to as a "node." Networks generally facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

A user computer system 104 may include a processor 145 and memory 146. The user computing system 104 may include a server, a mobile computing device, a smartphone, a tablet computer, a Wi-Fi-enabled device, wearable computing device or other personal computing device capable of wireless or wired communication, a thin client, or other known type of computing device. The memory 146 may include various modules including instructions that, when executed by the processor 145 control the functions of the user computer system generally and integrate the user computer system 104 into the system 100 in particular. For example, some modules may include an operating system 150A, a browser module 150B, a communication module 150C, and an electronic wallet module 150D. In some embodiments, the electronic wallet module 150D and its functions described herein may be incorporated as one or more modules of the user computer system 104. In other embodiments, the electronic wallet module 150D and its functions described herein may be incorporated as one or more sub-modules of the payment network system 108. In some embodiments, a responsible party 117 is in communication with the user computer system 104.

In some embodiments, a module of the user computer system 104 may pass user payment data to other components of the system 100 to facilitate determining a real-time transaction analysis determination. For example, one or more of the operating system 150A, a browser module 150B, a communication module 150C, and an electronic wallet module 150D may pass data to a merchant computer system 106 and/or to the payment network system 108 to facilitate a payment transaction for a good or service. Data passed from the user computer system 104 to other components of the system may include a customer name, a customer ID (e.g., a Personal Account Number or "PAN"), address, current location, and other data.

The merchant computer system 106 may include a computing device such as a merchant server 129 including a processor 130 and memory 132 including components to facilitate transactions with the user computer system 104 and/or a payment device via other entities of the system 100. In some embodiments, the memory 132 may include a transaction communication module 134. The transaction communication module 134 may include instructions to send merchant messages 134A to other entities (e.g., 104, 108, 110) of the system 100 to indicate a transaction has been initiated with the user computer system 104 and/or payment device including payment device data and other data as herein described. The merchant computer system 106 may include a merchant transaction repository 142 and instructions to store payment and other merchant transaction data 142A within the transaction repository 142A. The merchant transaction data 142A may only correspond to transactions for products with the particular merchant or group of merchants having a merchant profile (e.g., 164B, 164C) at the payment network system 108.

The merchant computer system 106 may also include a product repository 143 and instructions to store product data 143A within the product repository 143. For each product offered by the merchant computer system 106, the product data 143A may include a product name, a product UPC code, an item description, an item category, an item price, a number of units sold at a given price, a merchant ID, a merchant location, a customer location, a calendar week, a date, a historical price of the product, a merchant phone number(s) and other information related to the product. In some embodiments, the merchant computer system 106 may send merchant payment data corresponding to a payment device to the payment network system 108 or other entities of the system 100, or receive user payment data from the user computer system 104 in an electronic wallet-based or other computer-based transaction between the user computer system 104 and the merchant computer system 106.

The merchant computer system 106 may also include a fraud module 152 having instructions to facilitate determining fraudulent transactions offered by the merchant computer system 106 to the user computer system 104. Fraud may occur in many forms from using fraudulent physical cards to fraudulent account numbers to false or misleading communication signals. The fraud API 152A may include instructions to access one or more backend components (e.g., the payment network system 108, the transaction analysis system 110, etc.) and/or the local fraud module 152 to configure a fraud graphical interface 152B to dynamically present and apply the transaction analysis data 144 to products or services 143A offered by the merchant computer system 106 to the user computer system 104. A merchant historical fraud determination module 152C may include instructions to mine merchant transaction data 143A and determine a list of past fraudulent merchants to obtain historical fraud information on the merchant.

The payment network system 108 may include a payment server 156 including a processor 158 and memory 160. The memory 160 may include a payment network module 162 including instructions to facilitate payment between parties (e.g., one or more users, merchants, etc.) using the payment system 100. The module 162 may be communicably connected to an account holder data repository 164 including payment network account data 164A.

The payment network account data 164A may include any data to facilitate payment and other funds transfers between system entities (e.g., 104, 106). For example, the payment network account data 164A may include account identification data, account history data, payment device data, etc. The module 162 may also be communicably connected to a payment network system transaction repository 166 including payment network system global transaction data 166A.

The global transaction data 166A may include any data corresponding to a transaction employing the system 100 and a payment device. For example, the global transaction data 166A may include, for each transaction across a plurality of merchants, data related to a payment or other transaction using a PAN, account identification data, a product or service name, a product or service UPC code, an item or service description, an item or service category, an item or service price, a number of units sold at a given price, a merchant ID, a merchant location, a merchant phone number(s), a customer location, a calendar week, and a date, corresponding to the product data 143A for the product that was the subject of the transaction or a merchant phone number. The payment module 162 may also include instructions to send payment messages 167 to other entities and components of the system 100 in order to complete transactions between users of the user computer system 104 and merchants of the merchant computer system 106 who are both account holders within the payment network system 108.

The transaction analysis system 110 may include one or more instruction modules including a transaction analysis module 112 that, generally, may include instructions to cause a processor 114 of a transaction analysis server 116 to functionally communicate with a plurality of other computer-executable steps or sub-modules, e.g., sub-modules 112A, 112B, 112C, 112D and components of the system 100 via the network 102. These modules 112A, 112B, 112C, 112D may include instructions that, upon loading into the server memory 118 and execution by one or more computer processors 114, dynamically determine transaction analysis data for a product 143A or a mobile merchant computer system 106 using various stores of data 124A in one more databases 124 such as fraud data 122A in a fraud database 122. As an example, sub-module 112A may be dedicated to dynamically determine transaction analysis data based on transaction data associated with a merchant 106.

Specific to the system, method and tangible computer readable medium of the present disclosure, the transaction analysis system 110 may take in fraud data 122A from a variety of sources such as the fraud module 152 from the merchant computer system 106 and from other sources including the parties that assist in the transaction, store the fraud data 122A in a fraud database 122 or one or more of the various databases 124 and may analyze the fraud data 122A to quickly and efficiently provide a fraud score 123 to users. The operation and application of machine learning as part of the transaction analysis system 110 may be further described in relation to FIGS. 6, 7A and 7B.

Figure 2:
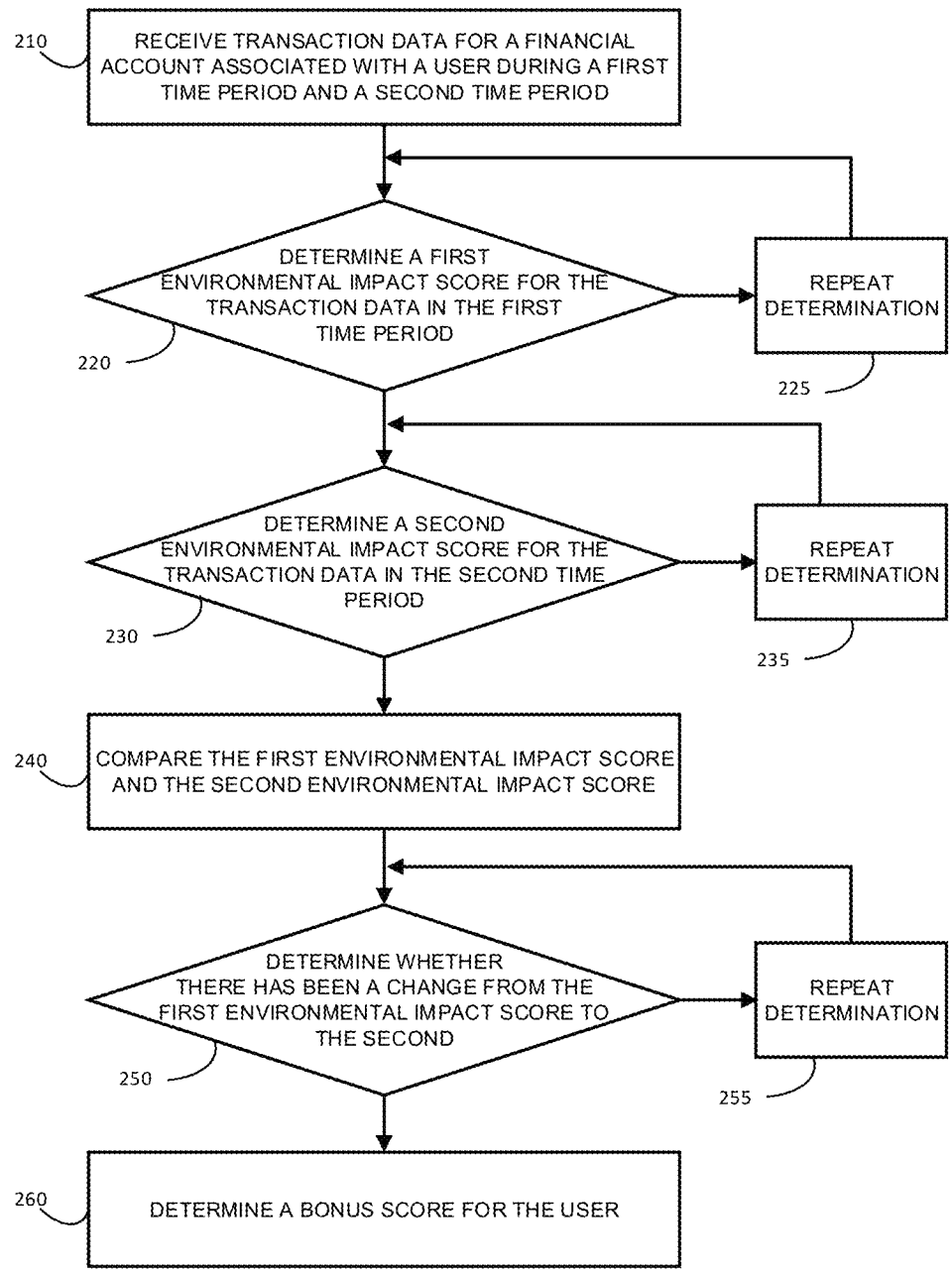
FIG. 2 may be a flow illustration of a method in accordance with the claims.

FIG. 2 may illustrate a sample method used by the system in accordance with the claims. The method may analyze the data from the payment system 100 described in FIG. 1 to determine the environmental impact of purchases over time and whether a bonus has been earned. At block 210, transaction data for a financial account associated with a user during a first time period and a second time period may be received. Transaction data may represent purchases made by a user. The purchases may electronic purchases such that the data may be collected and analyzed such as credit card purchases of debit card purchases. In addition, the purchases may be made with other stores of value such as using airline points, hotel points, bitcoins, Etherium, game credits, virtual currency, inter-bank credits, etc.

The first time period may be different from the second time period. The time periods are used to determine if a user has improved their purchases over time to better support the environment. Thus, the first time may be a first month such as January and the second time may be a second month such as the following month of February. The time period may be a number of days such as 30 days or 365 days. It may be useful to have the first time and the second time be the same length as the comparison between the first time period and the second time period may be more consistent. In other embodiments, the time periods may be normalized such that the comparison will be more logical. For example, comparing purchases during a 15 day time period to purchases during a 60 day time period may not be logical but comparing purchases per day may be more logical and useful.

At block 220, a first environmental impact score for the transaction data associated with the user in the first time period may be determined. Determining the environmental impact score may be according to an algorithm or a table that has been pre-populated with values. It may be useful to use a consistent measure so that comparisons may be made over time.

The environmental impact may take on a variety of forms depending on the purchases being measured. For example, measuring the environmental impact of food may be different than measuring the environmental impact of transportation. Thus, pre-created measures of environmental impacts may be useful. In addition, the measures may be adjusted by parties to the method to encourage some behaviors over other behaviors. For example, a credit card may be directed to rewarding people for driving less while another card may be directed to rewarding people for flying less.

In some embodiments, outside sources may be useful to help determine the environmental impact. For example, a distance traveled in a car may be useful to know. Similarly, it may be useful to know if a distance traveled was in a car or in public transportation. Thus, outside data sources such as gps location from a mobile computing device of a user may be useful. In addition, it may be useful to know if the user has used public transportation to get to work in the past.

Similarly, it may be useful to know where a person usual works and about what alternatives exist to travel to work such as bus line, transit line, working at home, etc. It also may be useful to understand if car sharing is prevalent and readily available in the area. In this way, useful alternatives may be compared to the current manner of getting to work. Outside data may be useful to provide additional information regarding the available transportation options. Logically, outside information may be useful for other purchases such as whether there are farmers markets nearby, whether there are low impact food options, and whether clothes are available for purchase that are more environmentally friendly.

In one embodiment, a first environmental impact score may be determined by analyzing each trip taken by the user during the first time period. The analysis may review what method of travel was used and what distance was traveled. A score may be assigned to each trip based on the method of travel and the distance traveled. For example, riding in a fuel guzzling car alone may have a high environmental impact score while walking may have a low environmental impact score. The score for each trip during the first time period may be summed to determine a travel score.

The travel score may be normalized to determine the first environmental impact score. As mentioned earlier, normalizing may ensure the impact scores are adjusted to make comparisons fair and equitable. For example, if an employee works in several locations, it would not be fair to compare a commute to the remote location to the commute a walkable location.

Determining a distance traveled may take on several forms. In one embodiment, geolocation data from the user may be received, and the geolocation data may include a first location and a second location for each trip during the first time period. Geolocation may be determined in a plurality of ways, such as the GPS signals from a portable computing device, the wifi points that were contacted during a journey, by electronic traffic camera and related analysis tools, from apps on a portable computing device or through any other manner that the user has agreed to allow to be used.

In other embodiments, the transportation may use advanced method which may provide a location. For example, an electric car may use induction pavement to charge the car and the induction pavement may track the devices that travel over the pavement thereby providing a location. Similarly, advance transportation devices may communicate with each other and a central authority to better manage travel congestion. The advanced transportation devices may be tracked with user permission as the transportation devices communicate with each other or with a central authority that manages congestion and tracks travel distances to appropriately charge tolls or user fees.

Logically, the first location may be different from the second location. For example, the first location may be a home address associated with the user and the second address may be a work address. Similarly, the first address may be a work address and the second address may be a home address. A fuel station may be another example of a first address or a second address as the fuel station may indicate the user is using an automobile and is on a given path.

When goods are being analyzed, the first and second environmental impact may be calculated in a similar way. Goods purchased in the first time period may be analyzed and an impact score may be assigned to each good purchased. The impact score for each good purchased during the first time period may be summed to determine a goods score. The goods score may be normalized to determine the first environmental impact score. Sample goods may include fuel, food, clothes, appliances, etc.

Referring again to FIG. 1, if the determination at block 220 is not successful or is not complete, at block 225, the method may return to block 220 and the determination may be repeated. If the determination at block 220 is successful, at block 230, a second environmental impact score may be determined for the transaction data associated with the user in the second time period. Similar to the first period, the environmental impact score may be created using an algorithm or a standard set of measures.

If the determination at block 230 is not successful or is not complete, at block 235, the method may return to block 230 and the determination may be repeated. If the determination at block 230 is successful, at block 240, the first environmental impact score and the second environmental impact score may be compared. The comparison may be a simple numerical difference. In some embodiments, the comparison may include the percentage difference. In some embodiments, weights are added to the scores to give further importance to more recent score and lower importance to more distant scores.

At block 250, it may be determined whether there has been a change from the first environmental impact score to the second environmental impact score. If the user take the same mode of transportation the same number of times during a similar time period, it is unlikely that there will be a change. But if the user changed the manner of transportation or good or services purchased from one time period to the next, it is expected that the environmental impact score would change. Similarly, if a user changed buying habits from one period to the next, a change would be expected in the environmental impact score.

FIGS. 3A and 3B may be used as an example of comparing purchases in a first period (July 2020 in FIG. 3A) to purchases in a second period (August 2020 in FIG. 3B). In July 2020, the amount spent on transportation was $321.35 (310) and in August 2020, the amount spent on transportation was $85.00 (315). At a high level, assuming the user followed a similar path and worked a similar number of days, it would appear the user improved the environmental impact of their transportation spending by not buying any fuel in August 2020 (310) and by buying a public transportation pass 315. Similarly in July 2020 (FIG. 3A), the user spend more money of food 320 including food that may be considered to have a high environmental impact like burger than in August 2020 (FIG. 3B) where the user spent less money 325 and on foods that may be considered to have a lower environmental impact like foods from a farmers market or salads. Finally, the user spent $312.56 on utilities in July 2020 (330) and $158.18 in August 2020 (335) which may indicate that the user had a lower environmental impact in August 2020 (FIG. 3B) by spending $132.56 than in July 2020 (FIG. 3A) where $148.18.

If the determination at block 250 is not successful or is not complete, at block 255, the method may return to block 250 and the determination may be repeated. If the determination at block 250 is successful, at block 260, in response to a determination that the second environmental impact score is less than the first environmental impact score, a bonus score may be determined for the user. The bonus may be determined in virtually any way. In some embodiments, the bonus may be in credits to be used on further purchases. In other embodiments, the bonus may be monetary. The calculation may be linear, exponential or logarithmic or a combination of a different calculations. Merchants may be able to set the bonus calculation. For example, the merchant may be able to set goal or offer bonuses if certain measures are met.

Figure 6:
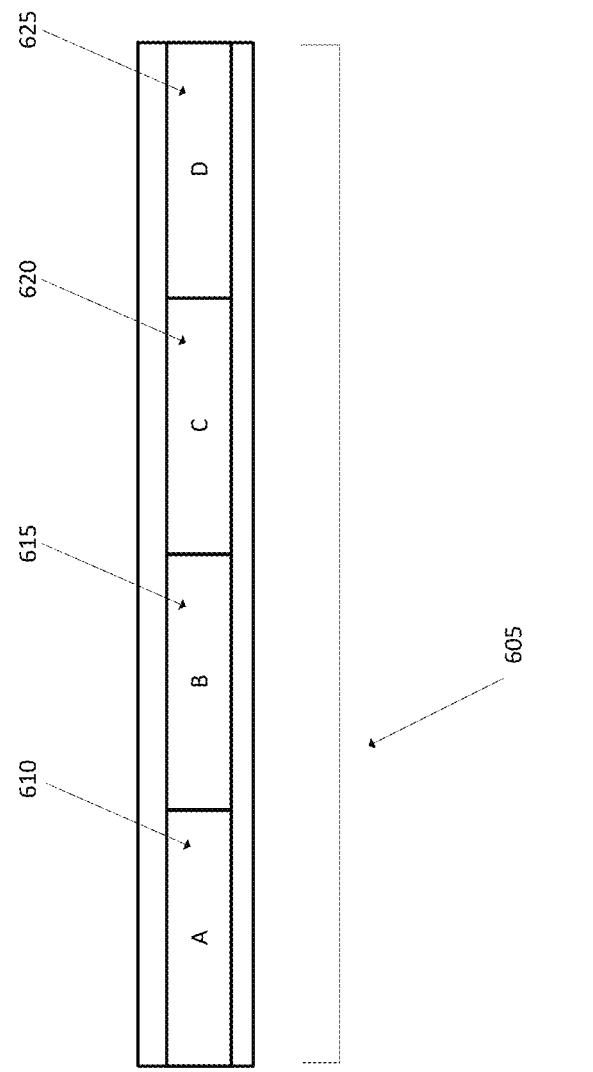
FIG. 6 may be an illustration of training data in a machine learning system.

Machine learning may be used to help determine what bonuses may change behavior in an environmentally positive way. For example, some bonus points may not be enough to change behavior while it may not be desirable to give away too many points unnecessarily. By reviewing past reward and the resulting behavior, the system may learn what bonus levels may result in the desired behavior. Machine learning may be used to assist in determining a desired bonus. Machine learning may be used to review a training group of past bonus data and determine bonus levels moving forward. FIG. 6 may illustrate a sample artificial intelligence (AI) training data according to one or more embodiments. As an example and not a limitation, an artificial intelligence system may trained by analyzing a set of training data 605. The training data may be broken into sets, such as set A 610, set B 615, set C 620 and set D 625. As illustrated in FIG. 7A, one set may be using as a testing set (say set D 625) and the remaining sets may be used as training set (set A 610, set B 615 and set C 620). The artificial intelligence system may analyze the training set (set A 610, set B 615 and set C 620) and use the testing set (set D 625) to test the model create from the training data. Then the data sets may shift as illustrated in FIG. 7B, where the test data set may be added to the training data sets (say set A 610, set B 615 and set D 625) and one of the training data sets that have not been used to test before (say set C 620) may be used as the test data set. The analysis of the training data (set A 610, set B 615 and set D 625) may occur again with the new testing set (set C 620) being used to test the model and the model may be refined. The rotation of data sets may occur repeatedly until all the data sets have been used as the test data sets. The model then may be considered complete and the model may then be used on additional data sets.

Figure 5:
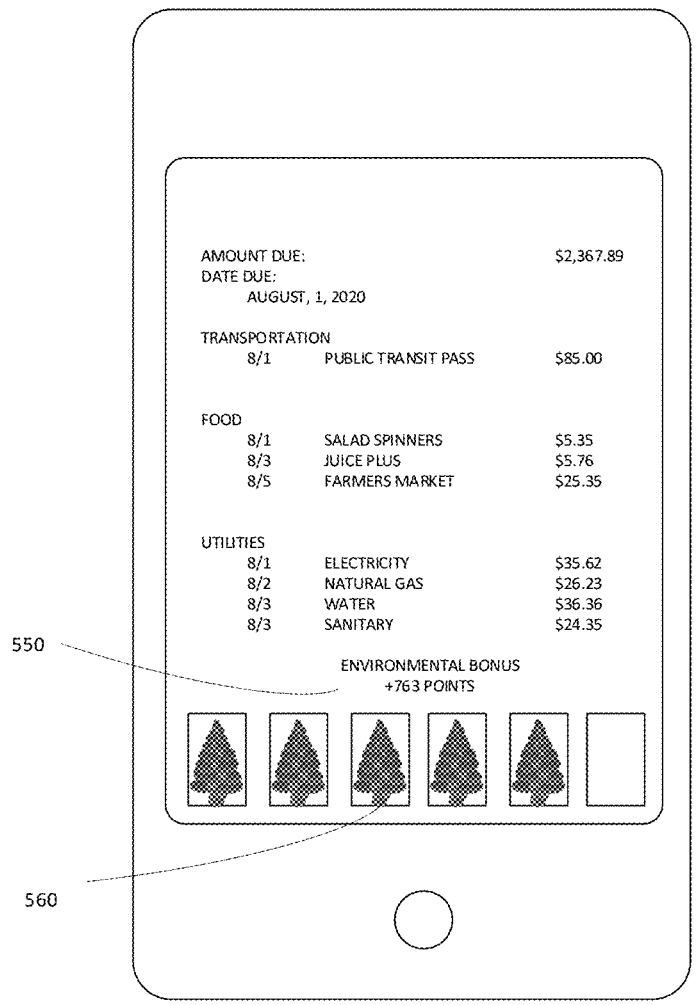
FIG. 5 may be an illustration of a user's progress toward a bonus being displayed.

A total score 405 may also be calculated as is illustrated in FIG. 4. The total score may start at 0 and may increase over time as the bonus score may be added to previous bonus scores to determine a total bonus score. In this example, a user may see their bonus increase over time. In some examples, a reward to the user may be provided if the total score for the user is higher than the second score. As illustrated in FIG. 5, a scoreboard may be provided to the user, where the scoreboard displays the total score 550 for the user during a third time period and a second score associated with a second user during the third time period. In some examples, a milestone may need to be reached before a reward is provided to the user. A visual indication 560 of the total score may be provided to the user so as the number of trees in FIG. 5, wherein the visual indication of the total score changes as the total score for the user approaches the milestone. As can be seen, one more tree may be needed to reach the goal of planting all the trees. A visual indication may be provided that the reward is available for redemption upon completion of the milestone.

Figure 7:
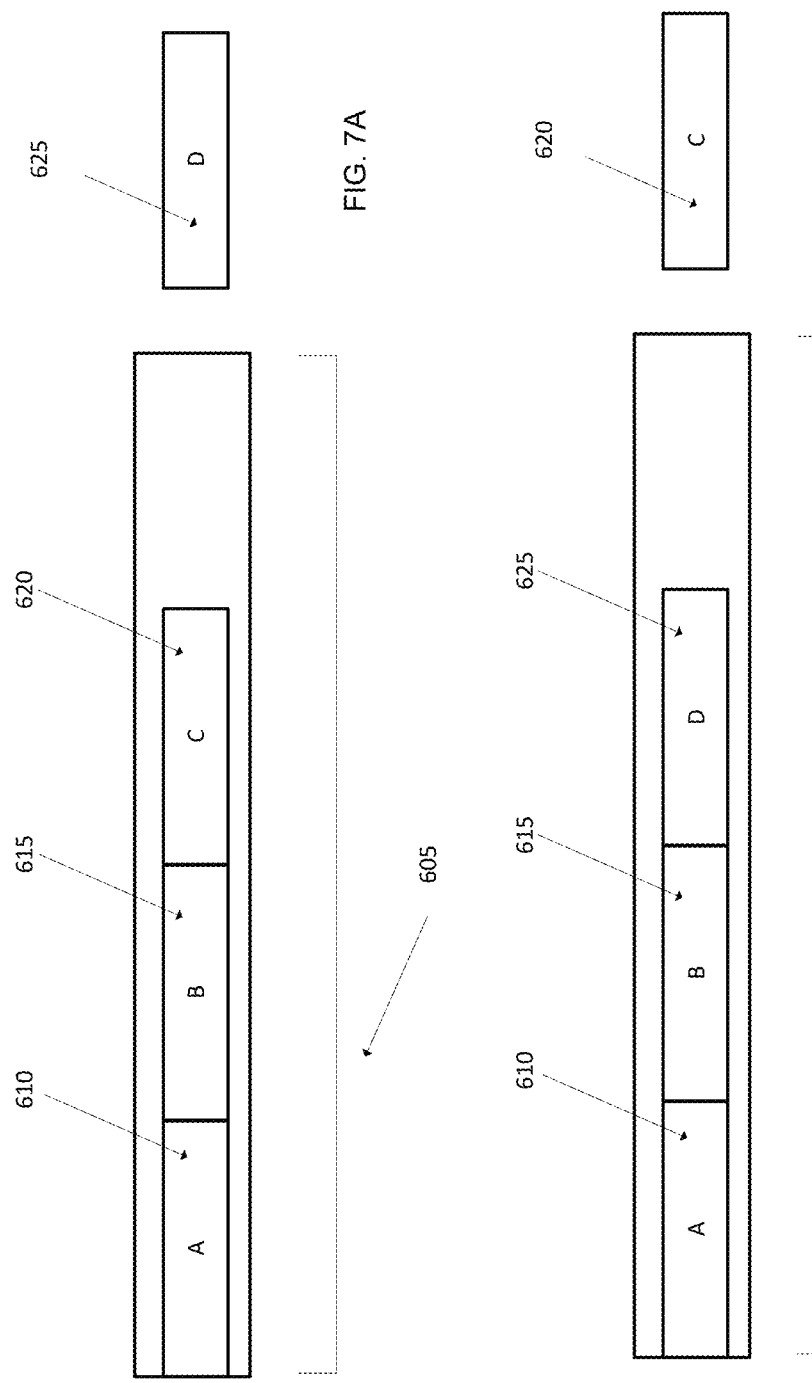
FIG. 7A may be an illustration of training data rotating as testing data.
FIG. 7B may be an illustration of training data rotating as testing data.
Figure 8:
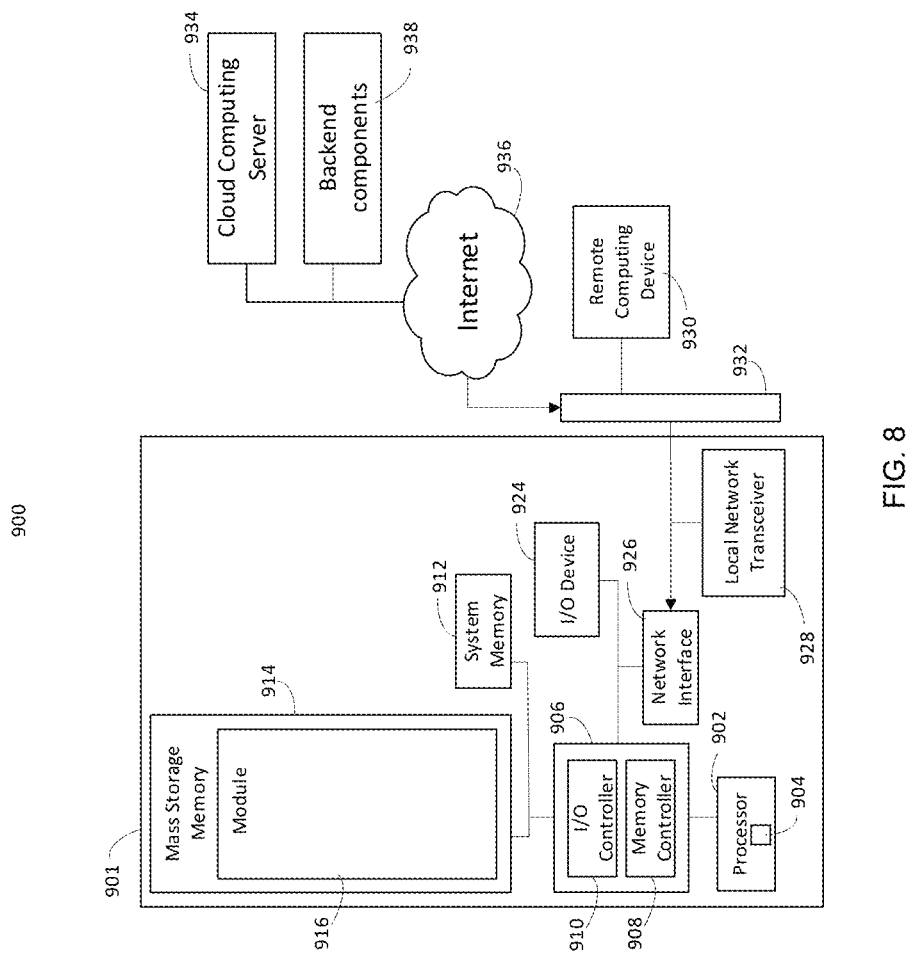
FIG. 8 may be an illustration of a sample computer used by the system.

As illustrated in FIG. 1, many computers may be used by the system. FIG. 8 may illustrate a sample computing device 901. The computing device 901 includes a processor 902 that is coupled to an interconnection bus. The processor 902 includes a register set or register space 904, which is depicted in FIG. 7 as being entirely on-chip, but which could alternatively be located entirely or partially off-chip and directly coupled to the processor 902 via dedicated electrical connections and/or via the interconnection bus. The processor 902 may be any suitable processor, processing unit or microprocessor. Although not shown in FIG. 7, the computing device 901 may be a multi-processor device and, thus, may include one or more additional processors that are identical or similar to the processor 902 and that are communicatively coupled to the interconnection bus.

The processor 902 of FIG. 8 is coupled to a chipset 906, which includes a memory controller 908 and a peripheral input/output (I/O) controller 910. As is well known, a chipset typically provides I/O and memory management functions as well as a plurality of general purpose and/or special purpose registers, timers, etc. that are accessible or used by one or more processors coupled to the chipset 906. The memory controller 908 performs functions that enable the processor 902 (or processors if there are multiple processors) to access a system memory 912 and a mass storage memory 914, that may include either or both of an in-memory cache (e.g., a cache within the memory 912) or an on-disk cache (e.g., a cache within the mass storage memory 914).

The system memory 912 may include any desired type of volatile and/or non-volatile memory such as, for example, static random access memory (SRAM), dynamic random access memory (DRAM), flash memory, read-only memory (ROM), etc. The mass storage memory 914 may include any desired type of mass storage device. For example, the computing device 901 may be used to implement a module 916 (e.g., the various modules as herein described). The mass storage memory 914 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 901, the systems and methods described herein. Thus, a module, block, function, operation, procedure, routine, step, and method can be implemented in hardware, firmware, and/or software. In one embodiment, program modules and routines are stored in mass storage memory 914, loaded into system memory 912, and executed by a processor 902 or can be provided from computer program products that are stored in tangible computer-readable storage mediums (e.g. RAM, hard disk, optical/magnetic media, etc.).

The peripheral I/O controller 910 performs functions that enable the processor 902 to communicate with a peripheral input/output (I/O) device 924, a network interface 926, a local network transceiver 928, (via the network interface 926) via a peripheral I/O bus. The I/O device 924 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O device 924 may be used with the module 916, etc., to receive data from the transceiver 928, send the data to the components of the system 100, and perform any operations related to the methods as described herein. The local network transceiver 928 may include support for a Wi-Fi network, Bluetooth, Infrared, cellular, or other wireless data transmission protocols. In other embodiments, one element may simultaneously support each of the various wireless protocols employed by the computing device 901. For example, a software-defined radio may be able to support multiple protocols via downloadable instructions. In operation, the computing device 901 may be able to periodically poll for visible wireless network transmitters (both cellular and local network) on a periodic basis. Such polling may be possible even while normal wireless traffic is being supported on the computing device 901. The network interface 926 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 908 and the I/O controller 910 are depicted in FIG. 8 as separate functional blocks within the chipset 906, the functions performed by these blocks may be integrated within a single integrated circuit or may be implemented using two or more separate integrated circuits. The computing environment 900 may also implement the module 916 on a remote computing device 930. The remote computing device 930 may communicate with the computing device 901 over an Ethernet link 932. In some embodiments, the module 916 may be retrieved by the computing device 901 from a cloud computing server 934 via the Internet 936. When using the cloud computing server 934, the retrieved module 916 may be programmatically linked with the computing device 901. The module 916 may be a collection of various software platforms including artificial intelligence software and document creation software or may also be a Java® applet executing within a Java® Virtual Machine (JVM) environment resident in the computing device 901 or the remote computing device 930. The module 916 may also be a "plug-in" adapted to execute in a web-browser located on the computing devices 901 and 930. In some embodiments, the module 916 may communicate with back end components 938 via the Internet 936.

The system 900 may include but is not limited to any combination of a LAN, a MAN, a WAN, a mobile, a wired or wireless network, a private network, or a virtual private network. It is understood that any number of client computers are supported and can be in communication within the system 900.

Additionally, certain embodiments are described herein as including logic or a number of components, modules, blocks, or mechanisms. Modules and method blocks may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a processor configured using software, the processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" or "teaching" means that a particular element, feature, structure, or characteristic described in connection with the embodiment is included in at least one embodiment. The appearances of the phrase "in some embodiments" or "teachings" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

The invention claimed is:

1. A computer-implemented method for determining a reward,
comprising the steps of:
 receiving, via one or more processors, transaction data for a financial account associated with a user during a first time period and a second time period;
 determining, via one or more processors, a first environmental impact score for the transaction data associated with the user in the first time period, wherein determining the first environmental impact score comprises:
  analyzing, via the one or more processors, each trip taken by the user during the first time period comprising:
   determining a method of travel;
   determining a distance traveled;
  assigning, via the one or more processors, a score to each trip based on the method of travel and the distance traveled;
  summing, via the one or more processors, the score for each trip during the first time period to determine a travel score;
  normalizing, via the one or more processors, the travel score to determine the first environmental impact score;
 determining, via one or more processors, a second environmental impact score for the transaction data associated with the user in the second time period;
 comparing, via one or more processors, the first environmental impact score and the second environmental impact score;
 determining, via one or more processors, whether there has been a change from the first environmental impact score to the second environmental impact score;
 in response to a determination that the second environmental impact score is less than the first environmental impact score;
 determining, via one or more processors, a bonus score for the user determining, via one or more processors, a bonus score for the user, wherein determining the bonus score comprises:
  learning bonus levels based on reviewing past reward and resulting behavior;
 calculating, via the one or more processors, a total score for the user by adding the bonus score for the user to a current score for the user;
 providing a visual indication of the total score, the visual indication comprising:
  displaying the visual indication, wherein the visual indication of the total score changes as the total score for the user approaches a milestone; and
 displaying a reward for redemption based on completion of the milestone.

2. The method of claim 1, wherein the first time period is different from the second time period.

3. The method of claim 2, wherein the first time period is a first month and the second time period is a second month.

4. The method of claim 1, wherein determining a distance traveled, comprises:
 receiving, via the one or more processors, geolocation data from a user device, wherein the geolocation data includes a first location and a second location for each trip during the first time period.

5. The method of claim 4, wherein the first location is different from the second location.

6. The method of claim 4, wherein the first location is one of a home address associated with the user, a work address associated with the user, and a fuel station location.

7. The method of claim 4, wherein the second location is one of a home address associated with the user, a work address associated with the user, and a fuel station location.

8. The method of claim 1, wherein determining the first environmental impact score comprises:
 analyzing, via the one or more processors, goods purchased in the first time period;
 assigning, via the one or more processors, an impact score to each good purchased;
 summing, via the one or more processors, the impact score for each good purchased during the first time period to determine a goods score;
 normalizing, via the one or more processors, the goods score to determine the first environmental impact score.

9. The method of claim 8, wherein the goods include fuel.

10. The method of claim 1, wherein the current score is 0.

11. The method of claim 1, further comprising:
providing a scoreboard to the user, wherein the scoreboard displays the total score for the user during a third time period and a second score associated with a second user during the third time period.

12. The method of claim 11, further comprising:
providing the reward to the user if the total score for the user is higher than the second score.

13. The method of claim 11, wherein the third time period is one month.

14. The method of claim 1, further comprising:
determining a milestone that must be reached before the reward is provided to the user.

15. The method of claim 14, further comprising:
providing a visual indication that the reward is available for redemption upon completion of the milestone.

16. A non-transitory computer-readable medium storing instructions that cause one or more processors to:
receive transaction data for a financial account associated with a user during a first time period and a second time period;
determine a first environmental impact score for the transaction data associated with the user in the first time period, wherein the instructions cause the one or more processors to:
analyze each trip taken by the user during the first time period comprising:
determine a method of travel;
determine a distance traveled;
assign a score to each trip based on the method of travel and the distance traveled;
sum the score for each trip during the first time period to determine a travel score;
normalize the travel score to determine the first environmental impact score;
determine a second environmental impact score for the transaction data associated with the user in the second time period;
compare the first environmental impact score and the second environmental impact score;
determine whether there has been a change from the first environmental impact score to the second environmental impact score;
in response to a determination that the second environmental impact score is less than the first environmental impact score;
determine a bonus score for the user, wherein determining the bonus score causes the one or more processors to:
learn bonus levels based on reviewing past reward and resulting behavior;
calculate, a total score for the user by adding the bonus score for the user to a current score for the user;
provide a visual indication of the total score, wherein providing the visual indication causes the one or more processors to:
display the visual indication, wherein the visual indication of the total score changes as the total score for the user approaches a milestone; and
display a reward for redemption based on completion of the milestone.

17. A computer system for determining a reward comprising:
a processor physically configured according to computer executable instructions,
a memory disposed in communication with the processor and storing, in code form, the computer executable instructions to:
receive transaction data for a financial account associated with a user during a first time period and a second time period;
determine a first environmental impact score for the transaction data associated with the user in the first time period, wherein the computer executable instructions cause the processor to:
analyze each trip taken by the user during the first time period comprising:
determine a method of travel;
determine a distance traveled;
assign a score to each trip based on the method of travel and the distance traveled;
sum the score for each trip during the first time period to determine a travel score;
normalize the travel score to determine the first environmental impact score;
determine a second environmental impact score for the transaction data associated with the user in the second time period;
compare the first environmental impact score and the second environmental impact score;
determine whether there has been a change from the first environmental impact score to the second environmental impact score;
in response to a determination that the second environmental impact score is less than the first environmental impact score;
determine a bonus score for the user, wherein determining the bonus score causes the one or more processors to:
learn bonus levels based on reviewing past reward and resulting behavior;
calculate, a total score for the user by adding the bonus score for the user to a current score for the user;
provide a visual indication of the total score, wherein providing the visual indication causes the one or more processors to:
display the visual indication, wherein the visual indication of the total score changes as the total score for the user approaches a milestone; and
display a reward for redemption based on completion of the milestone.

\* \* \* \* \*

UNITED STATES PATENT AND TRADEMARK OFFICE
CERTIFICATE OF CORRECTION

PATENT NO. : 10,915,416 B1  
APPLICATION NO. : 16/530653  
DATED : February 9, 2021  
INVENTOR(S) : Vishakha Sangani et al.

Page 1 of 1

It is certified that error appears in the above-identified patent and that said Letters Patent is hereby corrected as shown below:

On the Title Page

Column 1, (71) Applicants: please delete "Vishakha Sangani, Austin, TX (US); Manan Sudhakarbhai Lakhani, Austin, TX (US); Emmanuel Okereke, Austin, TX (US); Jude Ogbuibe, Austin, TX (US)" and insert --VISA INTERNATIONAL SERVICE ASSOCIATION, San Francisco, CA (US)--.

Signed and Sealed this  
Seventeenth Day of May, 2022

Katherine Kelly Vidal  
*Director of the United States Patent and Trademark Office*